United States Patent [19]  
Duprez

[11] Patent Number: 4,763,834  
[45] Date of Patent: Aug. 16, 1988

[54] VALVE SEAT STRUCTURE FOR AUTOMOTIVE THERMOSTATIC FLUID CONTROL VALVE DEVICE

[75] Inventor: Wayne R. Duprez, Waltham, Mass.

[73] Assignee: Standard-Thomson Corporation, Waltham, Mass.

[21] Appl. No.: 66,235

[22] Filed: Jun. 25, 1987

[51] Int. Cl.⁴ .............................................. F01P 7/02
[52] U.S. Cl. .................................... 236/345; 251/333; 251/363
[58] Field of Search .................. 236/34, 34.5; 251/333, 251/363, 364

[56] References Cited

U.S. PATENT DOCUMENTS

| | | |
|---|---|---|
| 271,073 | 1/1883 | Jenkins . |
| 802,490 | 10/1895 | Bashlin . |
| 1,216,528 | 2/1917 | Wickert, Jr. . |
| 1,954,044 | 4/1934 | Guildford ........................ 251/333 X |
| 2,616,653 | 11/1952 | Tarr . |
| 2,806,375 | 9/1957 | Wood . |
| 2,806,376 | 9/1957 | Wood . |
| 2,969,951 | 1/1961 | Walton .......................... 251/364 X |
| 3,063,467 | 11/1962 | Roberts, Jr. et al. ........... 251/364 X |
| 3,168,282 | 2/1965 | Latshaw, Jr. et al. . |
| 3,248,056 | 4/1966 | Obermaier ....................... 236/34 |
| 3,591,138 | 7/1971 | Wolfe ................................. 251/333 |
| 3,893,618 | 7/1975 | Wong et al. . |
| 4,053,105 | 10/1977 | Wong et al. . |
| 4,164,322 | 8/1979 | Wong et al. . |
| 4,280,655 | 7/1981 | Duprez et al. . |
| 4,286,750 | 9/1981 | Wong et al. . |
| 4,426,036 | 1/1984 | Sliger . |
| 4,562,953 | 1/1986 | Duprez et al. . |

Primary Examiner—William E. Tapolcai  
Attorney, Agent, or Firm—Jacox & Meckstroth

[57] ABSTRACT

Valve seat structure for an automotive thermostatic fluid control valve device which is adapted to be positioned within a coolant fluid conduit system of an automotive engine. The valve seat structure has a rigid fluid flow control member which includes a cylindrical wall which forms a fluid flow passage. The rigid fluid flow control member also has an annular base which encompasses the cylindrical wall. An elastomeric sealing member resiliently encompasses the cylindrical wall. The elastomeric sealing member has an abutment portion and a clamping portion. Preferably, the abutment portion and the clamping portion are separated by a shoulder. A rigid clamping member has a clamping portion which is in engagement with the clamping portion of the elastomeric sealing member and is adapted to be clampingly engaged by a part of the coolant fluid conduit system. The rigid clamping member also has a shoulder portion which engages the shoulder of the elastomeric sealing member. The valve seat structure is adapted to be clamped between two portions of the coolant fluid conduit to maintain the position of the valve seat structure within the coolant fluid conduit. Thus, the rigid clamping member firmly retains the elastomeric sealing member with respect to the fluid flow control member. The abutment portion of the elastomeric sealing member is also engageable by a movable valve member to contol fluid flow through the fluid flow passage.

5 Claims, 2 Drawing Sheets

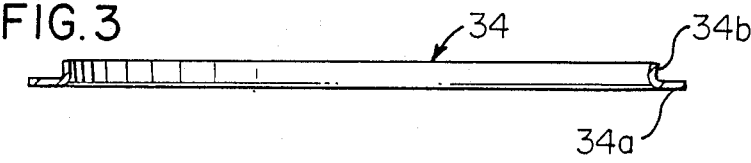
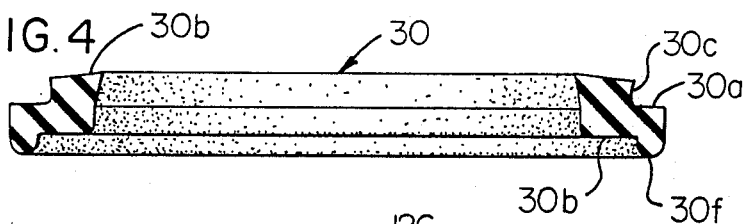
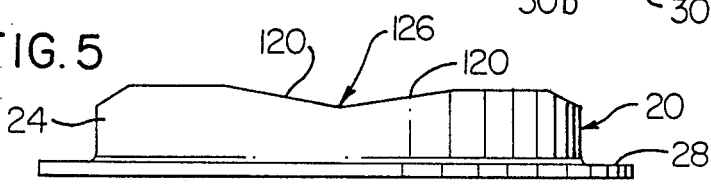
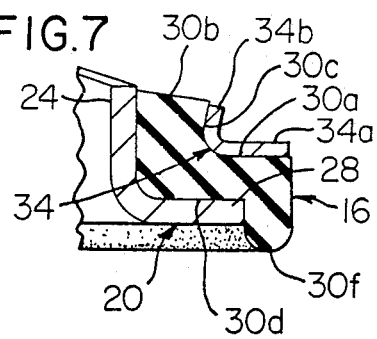
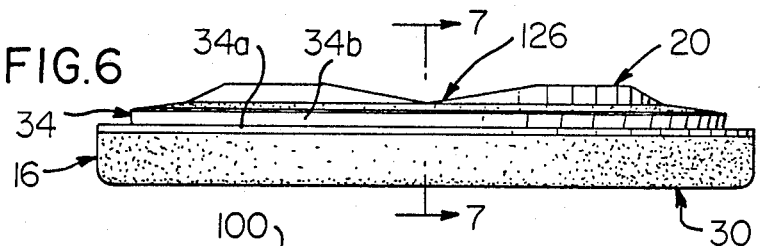
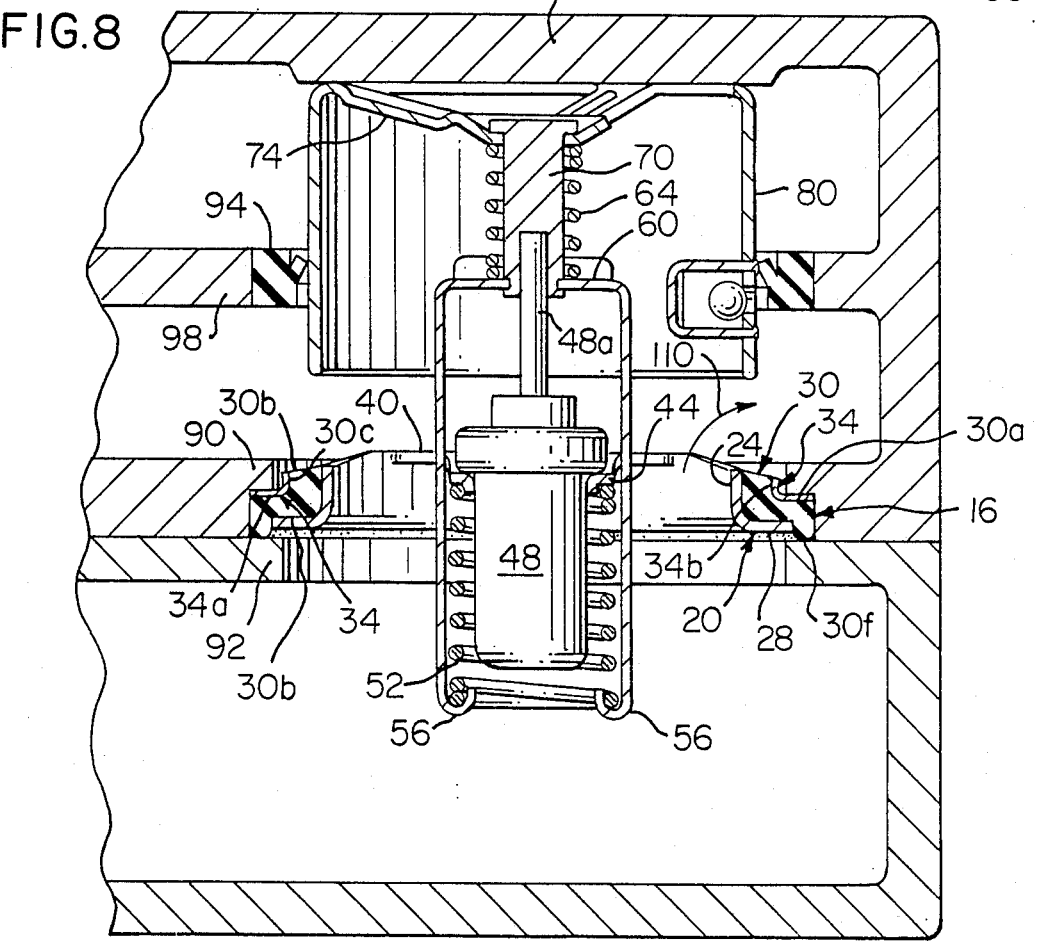

VALVE SEAT STRUCTURE FOR AUTOMOTIVE THERMOSTATIC FLUID CONTROL VALVE DEVICE

BACKGROUND OF THE INVENTION

This invention relates, at least generally, to the subject matter of U.S. Pat. Nos. 3,893,618, 4,053,105, 4,164,322, 4,280,655, 4,286,750, and 4,562,953. The thermally responsive fluid control valve devices disclosed in these patents control fluid flow in a fluid conduit in accordance with the temperature of the fluid flowing in the fluid conduit. The thermally responsive fluid control devices are particularly adapted to be positioned within the cooling system of an automotive engine to control flow of fluid within the cooling system.

An object of this invention is to provide such valve seat structure in which an elastomeric seal member is positioned to provide good sealing characteristics but which is not subject to the forces of flowing fluid.

Another object of this invention is to provide such valve seat structure for a thermostatic fluid control valve device which includes a sealing member and which eliminates the need for a separate sealing gasket.

Another object of this invention is to provide such valve seat structure which seals against fluid flow between the valve seat structure and the fluid conduit within which the valve seat structure is mounted and which also seals against fluid flow between the valve seat structure and a movable valve member which engages the valve seat structure.

Another object of this invention is to provide such valve seat structure which includes an elastomeric sealing member and a plurality of rigid members which maintain their relative positions without being attached together by bonding or the like.

Another object of this invention is to provide such valve seat structure in which an elastomeric sealing member is firmly retained in sealing position even when fluid pressures of high magnitudes are applied to the valve seat structure.

Another object of this invention is to provide fluid control valve seat structure by which assembly thereof is simplified.

Another object of this invention is to provide such fluid control valve seat structure which has long life and which is capable of operation through a multiplicity of valving cycles without failure of parts of the valve seat structure.

Other objects and advantages of this invention reside in the construction of parts, the combination thereof, the method of production and the mode of operation, as will become more apparent from the following description.

SUMMARY OF THE INVENTION

Valve seat structure of this invention includes a rigid cylindrical wall which forms a fluid passage therethrough and is adapted to be secured within fluid conduit structure of the cooling system of an internal combustion engine or the like. The valve seat structure also includes an annular base which encompasses the cylindrical wall and is attached thereto. The valve seat structure is adapted to be a part of any one of several types of fluid control valve devices.

Closely encompassing the cylindrical wall is an annular elastomeric sealing member. The elastomeric sealing member has a plurality of engagement portions. An annular clamping member covers a part of one of these engagement portions of the elastomeric sealing member. The clamping member is clampingly engaged by a part of the fluid conduit structure. Another engagement portion of the elastomeric sealing member directly engages a part of the fluid conduit structure. The elastomeric sealing member is thus firmly retained by the fluid conduit structure. Thus, fluid flow between the fluid conduit structure and the elastomeric sealing member is prevented.

The elastomeric sealing member of the valve seat structure of this invention also has an abutment portion which is engageable by a movable valve structure to control or prevent flow of fluid between the stationary valve seat structure and the movable valve structure. A thermally responsive actuator member is positioned to be responsive to the temperature conditions of fluid within the fluid conduit structure and is operably joined to the movable valve member for movement thereof in accordance with the temperature of the fluid in the fluid conduit structure.

BRIEF DESCRIPTION OF THE VIEWS OF THE DRAWINGS

FIG. 3 is a side sectional view of a clamping member of the valve seat structure of this invention.

FIG. 4 is a sectional view of an elastomeric sealing member of the valve seat structure of this invention.

FIG. 5 is a side elevational view of a flow director member of the valve seat structure of this invention.

FIG. 6 is a side elevational view of the valve seat structure of this invention.

FIG. 7 is an enlarged fragmentary sectional view taken substantially on line 7—7 of FIG. 6.

FIG. 8 is a sectional view, similar to FIG. 1, and drawn substantially on the same scale as FIG. 1, showing the movable valve member of the fluid control device in another position of operation and showing a portion of the fluid conduit system within which the fluid control device and the valve seat structure of this invention are mounted.

DETAILED DESCRIPTION OF THE INVENTION

Figure 1:
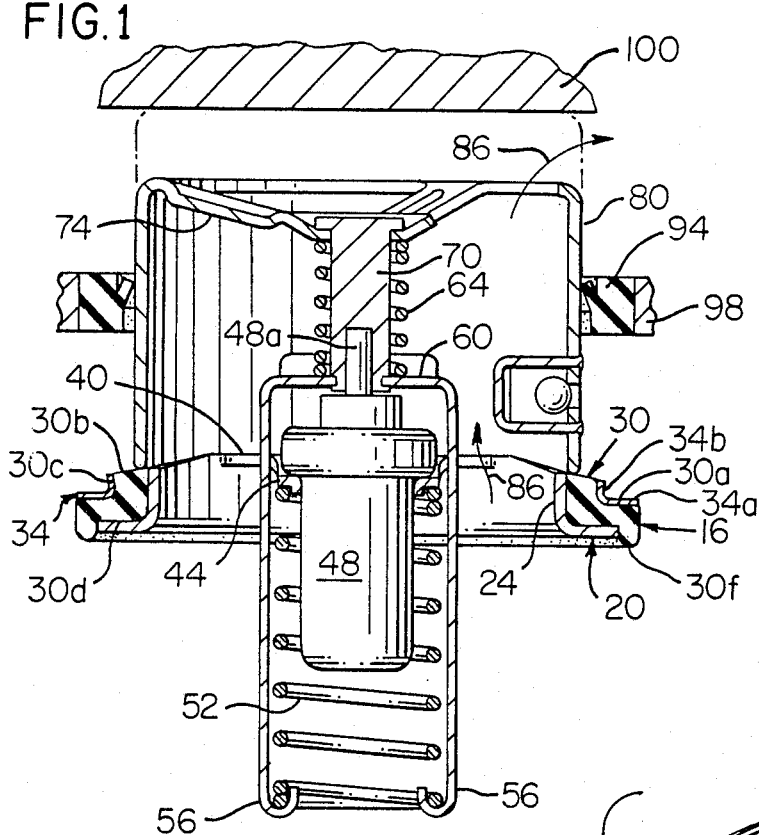
FIG. 1 is a sectional view illustrating a thermostatic fluid control valve device which includes stationary valve seat structure of this invention, showing a movable valve member of the fluid control valve device in engagement with the stationary valve seat structure and showing a portion of a fluid conduit system.

Stationary valve structure 16 of this invention includes a flow director member 20 which is of rigid material. The flow director member 20 has a generally cylindrical wall 24 which forms a flow passage. The flow director member 20 also includes an annular base 28, which encompasses the cylindrical wall 24, substantially normal thereto, and is attached thereto. Encompassing the cylindrical wall 24 and resting upon the annular base 28, is an annular sealing member or engagement member 30 which is of elastomeric material. The elastomeric sealing member 30 is provided with a clamping surface 30a and an abutment surface 30b. The surfaces 30a and 30b are joined by a curved shoulder 30c. Opposite the surfaces 30a and 30b, the sealing member 30 has a surface 30d, which is in engagement with the base 28 of the flow director member 20. The sealing member 30 also has a protruding rib or bead 30f, which encompasses the base 28 of the flow director member 20, as shown in FIG. 7. The sealing member 30 snugly resiliently encompasses the cylindrical wall 24 of the flow director member 20, without the need for bonding or other means of attachment of the sealing ment member 30 to the flow director member 20. The cylindrical wall 24 is shown as extending above or beyond the sealing member 30.

An annular clamping member 34 has a clamping portion 34a and a retainer portion 34b. The clamping portion 34a is positioned upon the clamping surface 30a of the sealing member 30. The retainer portion 34b is curved and is complementary to the curved shoulder 30c of the sealing member 30. The retainer portion 34b is in firm engagement with the curved shoulder 30c of the sealing member 30.

Figure 2:
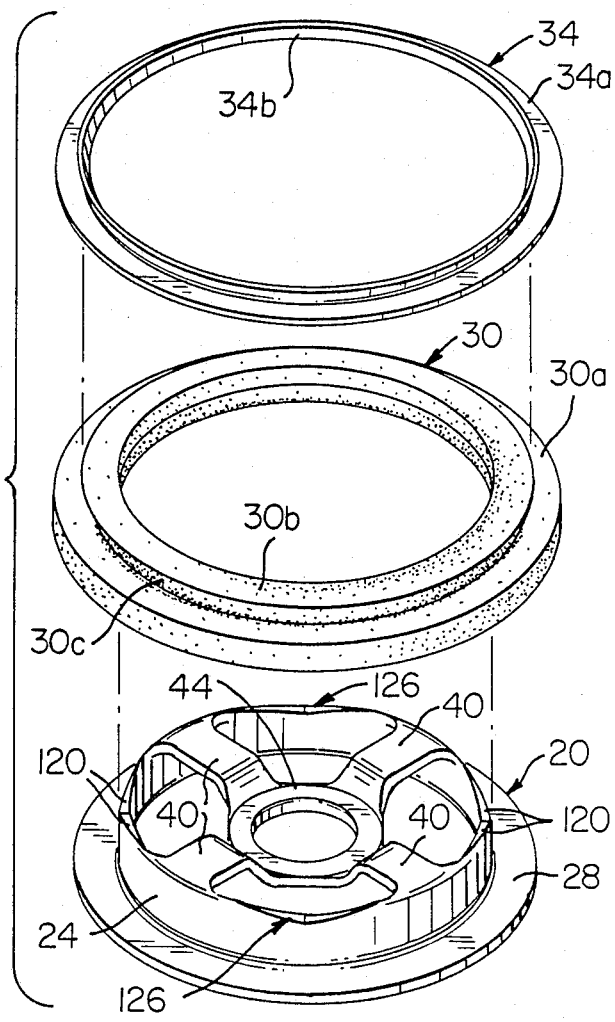
FIG. 2 is an exploded perspective view of the stationary valve seat structure of this invention.

The flow director member 20 includes connector members 40 which are joined to the cylindrical wall 24. The connector members 40 extend radially between the cylindrical wall 24 and an annular centrally located support portion 44, as best shown in FIG. 2.

The support portion 44 of the flow director member 20 supports a thermally responsive actuator member 48, which may be of any suitable type, such as, for example, the type shown in U.S. Pat. Nos. 2,806,375 and 2,806,376.

The stationary valve seat structure 16 of this invention is adapted to be a part of any one of various types of fluid flow control devices. Herein the stationary valve seat structure of this invention is shown as being in combination with a helical spring 52 which encompasses the actuator member 48 and engages the support portion 44 of the flow director member 20. The helical spring 52 also engages end portions of connector legs 56. The opposite ends of the connector legs 56 are joined to a cross member 60.

In engagement with the cross member 60 is an auxiliary helical spring 64. The actuator member 48 has an actuator stem 48a which also engages the cross member 60. The actuator stem 48a extends through the cross member 60 and also extends through the auxiliary helical spring 64. The actuator stem 48a is attached to a nut 70 which is attached to a plurality of spaced-apart arms 74. The arms 74 are attached to a movable valve member 80, herein shown as being a cylindrical member. The cylindrical movable valve member 80 is completely open at the lower end thereof. The spaced-apart arms 74 at the other end of the movable valve member 80 form a plurality of openings therebetween, as best shown in FIG. 1.

As illustrated in FIG. 8, a thermostatic fluid control device which includes stationary valve structure 16 of this invention is adapted to be positioned within a fluid flow control system. The clamping portion 34a of the clamping member 34 is clampingly engaged by a conduit member 90, as shown in FIG. 8. The bead or rib 30f is clampingly engaged by a conduit member 92. Thus, the sealing member 30 is clamped between the conduit member 90 and the conduit member 92. Thus, the sealing member 30 seals against flow of fluid between the valve seat structure 16 and the conduit members 90 and 92. A separate sealing gasket is not necessary.

The movable valve member 80 is slidably movable with respect to a seal ring 94 and is encompassed thereby. The seal ring 94 is attached to a partition 98 which is a part of the fluid conduit system. The movable valve member 80 is movable toward and away from an enclosure wall 100.

Normally the movable valve member 80 is in engagement with the surface 30b of the elastomeric sealing member 30, as shown in FIG. 1.

During some operating conditions, particularly during initial movement of the movable valve member 80 from the sealing member 30, the fluid pressure upon the sealing member 30 may be very high in magnitude. However, the clamping portion 34a and the retainer portion 34b of the clamping member 34 firmly retain the position and shape of the elastomeric sealing member 30 with respect to the flow director member 20 and with respect to the conduit members 90 and 92. Thus, fluid leakage between the elastomeric sealing member 30 and the flow director member 20 is prevented. Also fluid leakage between the sealing member 30 and the conduit members 90 and 92 is prevented.

The thermostatic fluid control valve device shown herein is of the type referred to as a by-pass valve device. The thermostatic fluid control valve device is shown in the figures of the drawings as being vertically oriented. However, of course, the orientation of the device may be in any other desired manner. Normally, fluid flow through the fluid control valve device is upwardly, through the valve seat structure 16 and through the movable valve member 80, as illustrated by arrows 86 in FIG. 1. Fluid flowing through the valve seat structure 16 flows past the thermally responsive actuator member 48. Thus, the thermally responsive actuator member 48 senses the temperature of the fluid flow.

When the temperature of the fluid exceeds a predetermined value, the thermally responsive actuator member 48 responds, and the actuator stem 48a is moved upwardly. Thus, the movable valve member 80 is moved upwardly, as illustrated in FIG. 8. As the movable valve member 80 moves upwardly, some of the fluid flowing in the coolant system flows between the movable valve member 80 and the cylindrical wall 24. As the movable valve member 80 begins to move upwardly, fluid begins to flow between the stationary valve structure 16 and the movable valve member 80. As this occurs fluid pressure tends to urge the abutment surface 30b upwardly and/or away from the cylindrical wall 24. However, the retainer portion 34b of the clamping member 34 maintains the sealing member 30 in engagement with the cylindrical wall 24.

Due to the fact that the cylindrical wall 24 of the stationary valve seat structure 16 of this invention is of rigid material, there is negligible wear upon the cylindrical wall 24 as a result of the forces of fluid flow upon or against the cylindrical wall 24. Due to the fact that the cylindrical wall 24 extends above the elastomeric sealing member 30, the cylindrical wall 24 protects the elastomeric sealing member 30, and the elastomeric sealing member 30 is not subjected to the direct forces of fluid flow. Therefore, the elastomeric sealing member 30 is not subject to damage by the forces of the fluid which flows through the flow director member 20.

When the thermally responsive actuator member 48 is subjected to higher temperatures, the actuator stem 48a moves upwardly and moves the movable valve member 80 upwardly, into engagement with the enclosure wall 100, as shown in FIG. 8. As the movable valve member 80 is in engagement with the enclosure wall 100, the upper end of the movable valve member 80 is closed, and all the fluid flow is between the movable valve member 80 and the cylindrical wall 24 of the stationary valve seat structure 16, as illustrated by an arrow 110 in FIG. 8.

The upper edge of the cylindrical wall 24 of the flow director member 20 may be planar or any other desired shape or configuration. Herein, the upper edge of the cylindrical wall 24 is shown in FIGS. 1, 2, 3, and 5 as having pairs of inclined surfaces 120, which form notches 126 in the upper edge of the cylindrical wall 24. Therefore, as the movable valve member 80 initially moves upwardly from the sealing member 30, fluid flow occurs only through the notches 126 of the cylindrical wall 24. Thus, initial fluid flow is limited, and the thermally responsive actuator 48 is not subjected to sudden changes in temperature of the flowing fluid.

Thus, there is smooth direct travel of the movable valve member 80, and there is no fluctuation in the initial movement thereof. As stated above, due to the fact that the cylindrical wall 24 of the stationary valve seat structure 16 is of rigid material, fluid flow past the upper edge of the wall 24 and/or through the notches 126 does not cause significant wear upon the cylindrical wall 24. Therefore, the cylindrical wall 24 has long life, while protecting the sealing member 30 from direct forces of fluid flow.

As stated above, the sealing member 30 does not need to be attached to the flow director member 20, as stated above. Therefore, bonding or attachment of the sealing member 30 to the flow director member 20 is not necessary. Therefore, costs of assembly and production are minimum. Furthermore, the elastomeric material of the sealing member 30 is of a quality which is readily adapted for sealing, and does not need to be of the type which is bondable or attachable to another element.

As shown and discussed above, the shoulder 30c of the elastomeric sealing member 30 is curved. The retainer portion 34b of the clamping member 34 fits snugly against the curved shoulder 34c. Thus, the clamping member 34 is firmly retained in position upon the elastomeric sealing member 30, and the clamping member 34 remains fixed with respect to the elastomeric sealing member 30 as the valve seat member 16 of this invention is moved prior to assembly into a fluid control device.

Although the preferred embodiment of the valve seat structure of this invention has been described, it will be understood that within the purview of this invention various changes may be made in the form, details, proportion and arrangement of parts, the combination thereof, and the mode of use, which, generally stated, consist in valve seat structure within the scope of the appended claims.

The invention having thus been described, the following is claimed.

1. A thermostatic fluid control valve device adapted to be mounted in a fluid conduit system and being of the type provided with stationary valve structure having a rigid cylindrical wall forming a flow passage, an annular elastomeric sealing member snugly encompassing the cylindrical wall, the elastomeric sealing member including an abutment portion and a clamping portion, the abutment portion and the clamping portion being substantially at right angles, one with respect to the other, with a shoulder between the abutment portion and the clamping portion, the abutment portion having an abutment surface, the clamping portion having a clamping surface, the surfaces being somewhat parallel, a movable valve member engageable with the stationary valve structure and movable toward and away from the stationary valve structure, a thermally responsive actuator operably joined to the movable valve member for movement thereof, the improvement comprising a rigid annular clamping member encompassing the abutment portion of the elastomeric sealing member, the annular clamping member having a first portion and a second portion, the portions being substantially at right angles, one with respect to the other, the first portion of the annular clamping member having a surface in engagement with the clamping surface of the clamping portion of the sealing member to maintain the configuration of the clamping portion of the elastomeric sealing member, the first portion of the clamping member having an opposed surface adapted to be engaged by a part of the fluid conduit system for securing the stationary valve structure within the fluid conduit system for fluid flow through the flow passage formed by the rigid cylindrical wall, the abutment surface of the abutment portion of the annular elastomeric sealing member being engageable by the movable valve member to prevent fluid flow between the stationary valve structure and the movable valve member, the second portion of the annular clamping member being in engagement with the shoulder which separates the clamping portion and the abutment portion of the elastomeric sealing member, as the second portion of the annular clamping member maintains the configuration of the abutment portion of the elastomeric sealing member, the movable valve member being engageable with the abutment portion of the elastomeric sealing member and movable with respect to the abutment surface to control fluid flow between the stationary valve structure and the movable valve member.

2. Valve seat structure for a thermally responsive valve device for a fluid conduit system, the thermally responsive valve device being provided with a movable valve member which is movable into engagement and out of engagement with the valve seat structure for control of fluid flow through valve seat structure, thermally responsive actuator means operably connected to the movable valve member for movement thereof, the valve seat structure including an annular flow director member provided with a rigid cylindrical wall forming a flow passage therethrough, the annular flow director member also having an annular support portion which is substantially normal to the cylindrical wall, an annular elastomeric sealing member having an annular abutment portion snugly encompassing the cylindrical wall and having an annular clamp portion in engagement with the annular support portion of the annular flow director member, the annular abutment portion and the annular clamp portion of the elastomeric sealing member being substantially at right angles, the annular abutment portion of the elastomeric sealing member having an abutment surface engageable by the movable valve member to control fluid flow between the stationary valve seat structure and the movable valve member, the improvement comprising an annular rigid clamp member which includes a clamp portion, the clamp portion of the clamp member being in engagement with clamp portion of the elastomeric sealing member, the clamp portion of the annular rigid clamp member being clampingly engaged by a part of the fluid conduit system to retain the configuration of the elastomeric clamp portion of the elastomeric sealing member and to retain the position of the valve seat structure with respect to the fluid conduit system, the annular rigid clamp member also including an annular engagement portion which is in engagement with the annular abutment portion of the annular elastomeric sealing member, to maintain the configuration of the annular abutment portion of the elastomeric sealing member between the annular engagement portion of the clamp member and the rigid cylindrical wall of the annular flow director member.

3. The valve seat structure of claim 2 in which annular engagement portion of the annular rigid clamp member is angular with respect to the clamp portion of the annular rigid clamp member, the annular engagement portion being in engagement with the abutment portion of the elastomeric sealing member, the abutment portion of the elastomeric sealing member thus being retained between the rigid cylindrical wall of the annular flow director member and the annular engagement portion of the annular rigid clamp member.

4. The valve seat structure of claim 2 in which the annular elastomeric seal member includes an annular shoulder portion and in which the annular clamp member includes an annular part which is in engagement with the annular shoulder portion of the elastomeric seal member.

5. Valve seat structure for a thermally responsive fluid control valve device provided with a movable valve member and a thermally responsive actuator member operably connected to the movable valve member for movement thereof, the valve seat structure being adapted to be positioned between parts of a fluid conduit system, the valve seat structure being of the type having a rigid flow director member provided with a cylindrical wall forming a fluid flow passage, support means attached to the cylindrical wall and supporting the thermally responsive actuator member, an elastomeric sealing member resiliently encompassing the cylindrical wall, the elastomeric sealing member having an abutment portion and a clamping portion, the elastomeric sealing member also having a shoulder portion which separates the abutment portion and the clamping portion, the improvement comprising:

a rigid annular clamping member, the rigid annular clamping member including a clamp portion which is in engagement with the clamping portion of the elastomeric sealing member, the rigid annular clamping member also including an annular shoulder portion which is angular with respect to the clamp portion of the annular clamping member, the shoulder portion of the annular clamping member being in engagement with the shoulder portion of the elastomeric sealing member, at least a part of the abutment portion of the elastomeric sealing member thus being retained between the cylindrical wall of the flow director member and the shoulder portion of the annular clamping member, whereby the configuration of the abutment portion of the elastomeric sealing member is maintained, the movable valve member being engageable with the abutment portion of the elastomeric sealing member and movable with respect thereto to control fluid flow through the flow passage formed by the cylindrical wall of the flow director member, the clamp portion of the rigid annular clamping member being engaged by a part of the fluid conduit system to retain the position of the thermally responsive valve device within the fluid conduit system and to maintain the configuration of the clamping portion of the elastomeric sealing member.

* * * * *